United States Patent Office 3,385,842
Patented May 28, 1968

3,385,842
2-BENZOTHIAZOLYLAZO DYES CONTAINING A VINYLSULFONYLETHYL GROUP
Max A. Weaver, James M. Straley, and John I. Dale III, Kingsport, Tenn., assignors to Eastman Kodak Company, Rochester, N.Y., a corporation of New Jersey
No Drawing. Filed Aug. 30, 1965, Ser. No. 483,780
11 Claims. (Cl. 260—158)

ABSTRACT OF THE DISCLOSURE

Benzothiazolyl-azo-aniline compounds containing a vinylsulfonylethyl group attached to the aniline nitrogen atom are useful as dyes for hydrophobic textile materials.

---

This invention relates to novel water insoluble azo compounds useful as dyes for textile fibers, yarns and fabrics. In particular the invention is directed to azo compounds, such as azo dyestuffs, containing a vinylsulfonylethyl group.

The azo compounds of the invention have the general formula (I)
$$R-N=N-R_1-\underset{|}{N}-C_2H_4SO_2CH=CH_2$$
$$\hspace{2cm} R_2$$

wherein R represents a 2-benzothiazolyl radical, that is, a radical having the general formula

in which Ar represents an ortho-phenyl radical, whether substituted or non-substituted, as in 2-aminobenzothiazole and the substituted 2-aminobenzothiazoles described in the examples and table below. Particularly suitable substituents on the ortho-phenyl radical include the lower alkylsulfonyl, nitro, cyano, lower cyanoalkylsulfonyl, lower alkyl and halo radicals.

$R_1$ represents a monocyclic carbocyclic aromatic group of the benzene series derived from an aminoalkylaniline coupling component and including p-phenylene or p-phenylene substituted with lower alkyl, e.g., o,m-methyl-p-phenylene; lower alkoxy, e.g., o,m-methoxy-p-phenylene; halogen e.g., o,m-chloro-p-phenylene; lower alkylthio, e.g., o,m-methylthio-p-phenylene; lower alkanoylamido, e.g., o,-m-acetamido-p-phenylene; or lower alkylsulfonamido, e.g., o,m-methylsulfonamido-p-phenylene.

$R_2$ represents hydrogen or an alkyl radical including unsubstituted alkyl, preferably lower alkyl, i.e., from 1 to 4 carbon atoms, and substituted alkyl such as hydroxyalkyl, e.g., hydroxyethyl; polyhydroxylalkyl, e.g., 2,3 dihydroxypropyl lower alkoxyalkyl, e.g., methoxyethyl; cyanoalkyl, e.g., cyanoethyl; lower cyanoalkoxyalkyl, e.g., β-cyanoethoxyethyl; lower alkanoyloxyalkyl, e.g., acetoxyethyl; lower carbalkoxyalkyl, e.g., carbethoxyethyl; halogenoalkyl, e.g., chloroethyl; hydroxyhalogenoalkyl, e.g., β-hydroxy-α-chloropropyl; lower alkylsulfonylalkyl, e.g., methylsulfonylethyl; lower alkyl

—OCOOCH$_2$CH$_2$— e.g., CH$_3$OCOOCH$_2$CH$_2$; carbamoylalkyl, e.g., carbamoylethyl; lower alkylcarbamoylalkyl, e.g., ethylcarbamoylethyl; benzyl, phenoxyalkyl, e.g., β-phenoxyethyl; lower alkylsulfonamidoalkyl, e.g., methylsulfonamidoethyl; dicarboxamidoalkyl, e.g., β-dicarboxamidoethyl, etc., or $R_2$ represents a monocyclic carbocyclic aromatic radical of the benzene series, e.g., unsubstituted phenyl and substituted phenyl such as represented by R and $R_1$ above, e.g., lower alkylphenyl, lower alkoxyphenyl, halophenyl, etc. A preferred group represented by $R_2$ includes hydrogen, alkyl, alkanoyloxyalkyl, phenoxyalkyl, acyloxyalkyl, haloalkyl, hydroxyalkyl, carbethoxyalkyl or cyanoalkyl, the alkyl groups of which are lower alkyl.

As can be seen from the examples given below, the substituents attached to the R, $R_1$ and $R_2$ groups serve primarily as auxochrome groups to control the color of the azo compound.

The azo compounds of the invention are prepared by coupling the diazonium salts of the above-described 2-aminobenzothiazoles with vinylsulfonylethylaniline coupling components having the formula (II)
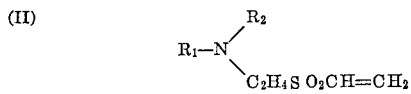

wherein $R_1$ and $R_2$ have the meaning given above.

The coupling components having the above Formula II are prepared by the following method:

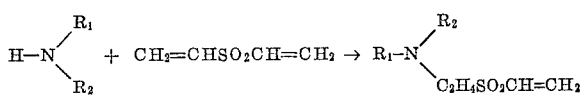

The azo compounds can be used for dyeing textile materials including synthetic polymer fibers, yarns and fabrics giving a variety of fast shades including red, violet and scarlet when applied thereto by conventional dye methods. The azo compounds have moderate affinity for cellulose ester and polyamide fibers. When the azo compounds are used for dyeing such hydrophobic materials, they should be free of water-solubilizing groups such as sulfo and carboxyl. In general, the dyes have good fastness, for example, to light, washing, gas (atmospheric fumes) and sublimation.

The following examples will serve to illustrate the preparation of representative intermediates and azo compounds of our invention.

Examples of vinylsulfonylethylaniline couplers.—Preparation of N-ethyl-N-β-vinylsulfonylethylaniline 23.6 g. divinylsulfone, 24.2 g. N-ethylaniline and 105 ml. toluene were refluxed for 24 hours. The toluene was removed under reduced pressure and the product distilled at 167–183° C./0.75 mm. had the structure:

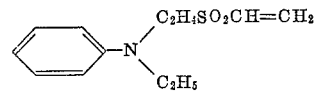

Preparation of N-ethyl-N-β-vinylsulfonylethyl-m-toluidine 27 g. of N-ethyl-m-toluidine, 23.6 divinylsulfone, 5 ml. acetic acid and 100 ml. toluene were mixed together and refluxed with stirring for 12 hours. The solvent was removed under reduced pressure and the product distilled under vacuum at 157–159° C./0.35 mm. The product had the structure:

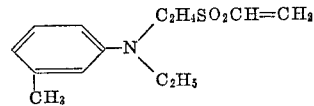

Preparation of N-hydroxyethyl-N-β-vinylsulfonylethylaniline

A solution of 6.75 g. β-anilinoethanol, 5 ml. acetic acid and 125 ml. toluene were added over a period of one and one-half hours to a refluxing solution of 61 g. divinylsulfone in 125 ml. toluene. The solution was stirred and heated at reflux for 4 hours and the solvent and lower boiling material were then removed under reduced pressure. Distillation of the residue on a cyclic falling film molecular still at 140–145° C. at 3–6 microns gave a product of the following structure:

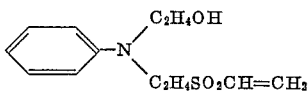

Preparation of N-vinylsulfonylethyl-o-toluidine 53.5 g. o-toluidine, 59.5 g. divinylsulfone, 200 ml. toluene, and 5 ml. acetic acid were mixed together and heated at reflux for 16 hours. The solvent and unreacted starting material were distilled under vacuum. The product distilled at 171–196° C. at 0.5/1.2 mm. Hg, and had the following structure:

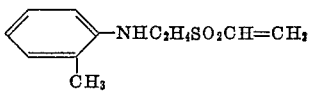

Preparation of N-ethyl-N-β-vinylsulfonylethyl-m-chloroaniline

In accordance with the method of preparation previously set forth, a solution of divinylsulfone, N-ethyl-m-chloroaniline and toluene was refluxed to prepare the product which has the structure:

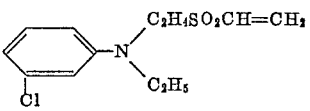

Preparation of N-β-acetoxyethyl-N-β-vinylsulfonylethylaniline

In accordance with the method of preparation previously set forth, a solution of divinylsulfone, N-β-acetoxyethylaniline and toluene were refluxed to prepare the product which has the structure:

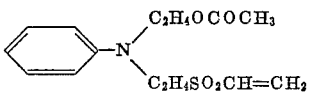

All of the couplers were prepared by the above methods.

*Examples of the dyes*

EXAMPLE 1

A solution of 2.28 g. of 2-amino-6-methylsulfonylbenzothiazole in 50 g. 50% aqueous sulfuric acid was cooled to −5° C. and a solution of 0.72 g. of $NaNO_2$ dissolved in 5 ml. conc. $H_2SO_4$ was added, keeping the temperature less than 0° C. The diazotization reaction was stirred 1.75 hrs. at 0° C., then added to a solution of 2.53 g. N-ethyl-N-β-vinylsulfonylethyl-m-toluidine dissolved in 100 ml. 15% $H_2SO_4$, all at about 5° C. The coupling was continued at this temperature for 2 hrs., then drowned with water, filtered, washed with water, and the dye dried in air. The product dyes cellulose acetate and polyester fibers a brilliant red shade with good fastness properties. This dye has the structure:

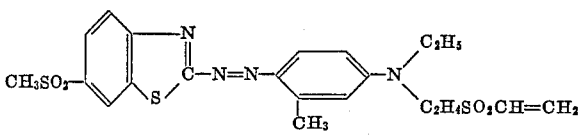

EXAMPLE 2

0.72 g. sodium nitrite was added portionwise to 5 ml. conc. $H_2SO_4$; the solution cooled in an ice bath to about 2° C. and 10 ml. 1:5 acid (1 part propionic:5 parts acetic) was added below 15° C. Then at below 10° C., 1.75 g. 2-amino-6-cyanobenzothiazole was added, followed by 10 ml. 1:5 acid. The reaction with stirred 2 hrs. at 0–5° C. and added to a solution of 2.39 g. N-ethyl-N-β-vinylsulfonylethylaniline dissolved in 100 ml. 1:5 acid at 5° C. Solid ammonium acetate was added until the solution turned Congo Red paper brown and the coupling allowed to stand 2 hrs. at ice bath temperature. It was then drowned with water, filtered, washed with water, and air dried. The product dyes cellulose acetate a bright red shade. The dye has the structure:

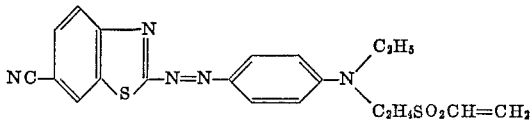

EXAMPLE 3

1.95 g. 2-amino-6-nitrobenzothiazole was suspended in 24 ml. water. To this was added, with stirring, 14 ml. conc. $H_2SO_4$. The solution was cooled to −5° C. and a solution of 0.72 g. $NaNO_2$ in 5 ml. conc. $H_2SO_4$ was added at less than 0° C. After stirring at about 0° C. the solution was added to a solution of 2.53 g. N-ethyl-β-vinylsulfonylethyl-m-toluidine dissolved in 100 ml. 15% $H_2SO_4$, all at about 5° C. The coupling was continued at this temperature for 2 hrs., then drowned with water, filtered, washed with water, and dried in air. The product dyes cellulose acetate and polyester fibers a deep violet shade with good fastness properties. This dye has the structure:

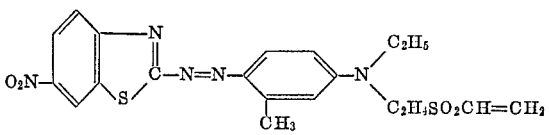

EXAMPLE 4

1.95 g. 2-amino-6-nitrobenzothiazole was diazotized exactly as described in Example 3. The diazonium solution was then added to a solution of 2.73 g. N-ethyl-N-β-vinylsulfonylethyl-m-chloroaniline in 100 ml. 15% $H_2SO_4$, keeping the temperature below about 10° C. After allowing to couple 1 hr. the reaction mixture was drowned with water, filtered, washed with water, and dried in air. The product dyes cellulose acetate and polyester fibers a brilliant red shade with good fastness properties and has the following structure:

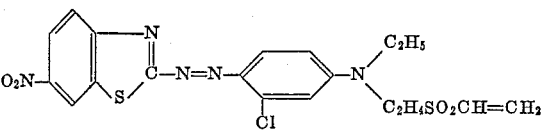

EXAMPLE 5

Using the procedure described in Example 1 and the same quantities of reagents and substituting 2.67 g. 2-amino-6-(2-cyanoethylsulfonyl)benzothiazole for the 2-amino-6-methylsulfonylbenzothiazole, the resulting diazonium solution was coupled with 2.25 g. N-β-vinylsulfonylethyl-o-toluidine. The dye obtained from this reaction dyes cellulose acetate and polyester fibers bright scarlet shades and has the following structure:

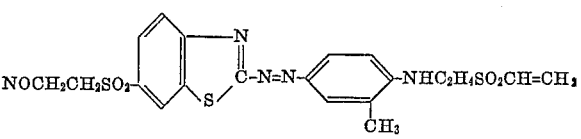

EXAMPLE 6

1.75 g. 2-amino-6-cyanobenzothiazole was diazotized as described in Example 2 and the diazonium solution added to a solution of 2.56 g. N-β-hydroxyethyl-N-β-vinylsulfonylethylaniline in 75 ml. 1:5 acid at 5° C. Solid ammonium acetate was added until the solution turned Congo Red paper brown and the coupling allowed to stand 1 hr. at 0–5° C. The reaction mixture was then drowned with water, filtered, washed with water and air dried. The product dyes cellulose acetate a bright red shade and has the following structure:

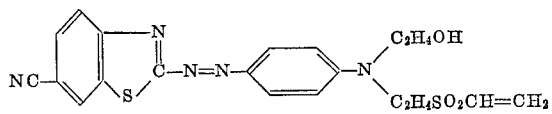

EXAMPLE 7

1.84 g. 2-amino-6-chlorobenzothiazole was placed in 24 ml. water and then 14 ml. conc. $H_2SO_4$ was added with stirring. The solution was cooled and a solution of 0.72 g. $NaNO_2$ in 5 ml. conc. $H_2SO_4$ was added below 5° C. After stirring at about 0° C. for 2 hrs. the diazonium solution was added to a solution of 2.97 g. N-β-acetoxyethyl-N-β-vinylsulfonylethylaniline dissolved in 50 ml. of 15% $H_2SO_4$ all at about 5° C. The coupling mixture was allowed to stand 2 hrs. at this temperature and then drowned with water, filtered, washed with water and air dried. The product dyes cellulose acetate, polyamide, and polyester fibers bright shades of scarlet. It has the following structure:

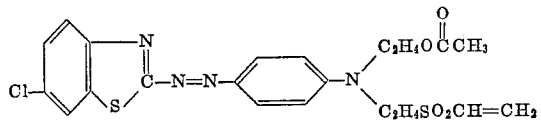

EXAMPLE 8

2.28 g. 2 - amino - 6 - methylsulfonylbenzothiazole was diazotized using the procedure described in Example 1. The diazonium solution was added to a solution of 2.39 g. N - ethyl - N - β - vinylsulfonylethylaniline in 50 ml. 15% $H_2SO_4$ at 5° C.

The coupling was completed and the dye isolated as described in Example 1. The product dyes cellulose acetate, polyamide, and polyester fibers bright shades of red. It has the following structure:

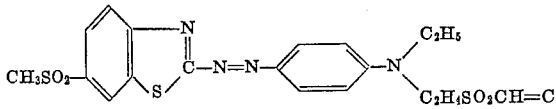

EXAMPLE 9

1.75 g. 2 - amino - 6 - cyanobenzothiazole was diazotized as described in Example 2 and the diazonium solution added to a solution of 2.53 g. N-ethyl-N-β-vinyl-sulfonyethyl-m-toluidine dissolved in 100 ml. 1:5 acid at 5° C. Solid ammonium acetate was added until the solution turned Congo Red paper brown and the coupling allowed to stand 2 hrs. at ice bath temperature. It was then drowned with water, filtered, washed with water and air dried. The product dyes cellulose acetate bright shades of red and has the structure:

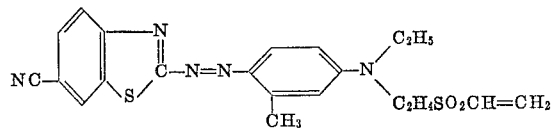

The azo compounds of the following table were prepared by the method illustrated in Examples 1 through 9. Thus, the diazonium salts were coupled with the vinylsulfonylethylaniline couplers of the Formula II to obtain dyes having the general structure illustrated by Formula I, above.

| Example | Substituent on ortho-phenyl radical | $R_1$ | $R_2$ | Color on Acetate |
|---|---|---|---|---|
| 10 | 6-$CH_3SO_2$— | Phenylene | —$C_2H_5$ | Red. |
| 11 | 6-$CH_3SO_2$— | m-Tolylene | —$CH_3$ | Red. |
| 12 | 6-$CH_3SO_2$— | m-$CH_3O$-phenylene | —$C_2H_5$ | Violet. |
| 13 | 6-$CH_3SO_2$— | m-Cl-phenylene | —$C_2H_5$ | Red. |
| 14 | 6-$CH_3SO_2$— | o-Tolylene | H | Scarlet. |
| 15 | 6-$CH_3SO_2$— | 2,5-di-$OCH_3$-phenylene | —$C_2H_5$ | Violet. |
| 16 | 6-$CH_3SO_2$— | m-$NHCOCH_3$ phenylene | —$C_2H_5$ | Do. |
| 17 | 6-$NO_2$ | m-Tolylene | —$C_2H_5$ | Do. |
| 18 | 6-$NO_2$ | do | —$C_2H_4OH$ | Do. |
| 19 | 6-$NO_2$ | do | —$C_2H_4Cl$ | Do. |
| 20 | 6-CN | Phenylene | —$C_2H_4Br$ | Red. |
| 21 | 6-CN | m-Tolylene | —$C_2H_4OCH_3$ | Red. |
| 22 | 6-CN | do | —$C_2H_4CO_2C_2H_5$ | Red. |
| 23 | 6-CN | do | —$C_2H_4SO_2CH_3$ | Red. |
| 24 | 6-CN | do | —$C_2H_4CN$ | Red. |
| 25 | 6-CN | do | —$C_2H_4CONH_2$ | Red. |
| 26 | 6-$SO_2NH_2$ | do | —$C_2H_5$ | Red. |
| 27 | 6-$SO_2NH_2$ | do | —$C_4H_9$-n | Red. |
| 28 | 6-$SO_2CH_2CH_2OH$ | do | —$C_2H_5$ | Red. |
| 29 | 6-$SO_2CH_2CH_2CN$ | do | —$C_2H_5$ | Red. |
| 30 | 6-$CH_3$ | do | —$C_2H_5$ | Scarlet. |
| 31 | None | do | —$C_2H_5$ | Do. |
| 32 | 6-$OCH_3$ | do | —$C_2H_5$ | Do. |
| 33 | 6-$SCH_3$ | do | —$C_2H_5$ | Do. |
| 34 | 6-$SO_2C_4H_9$-n | do | —$C_2H_5$ | Red. |
| 35 | 6-$SO_2N(CH_3)_2$ | do | —$C_2H_5$ | Red. |
| 36 | 4,6-dichloro | do | —$C_2H_5$ | Red. |
| 37 | 6-bromo | Phenylene | —$C_2H_5$ | Scarlet. |
| 38 | 6-$NHCOCH_3$ | m-Tolylene | —$C_2H_5$ | Red. |
| 39 | 6-$SCH_2CH_2CN$ | do | —$C_2H_5$ | Red. |
| 40 | 4-$CH_3$-6-$NO_2$ | do | —$C_2H_5$ | Violet. |
| 41 | 6-SCN | do | —$C_2H_5$ | Red. |

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 2,043,827. The following examples illustrate methods by which the azo compounds of the invention can be used to dye polyester textile materials.

0.1 g. of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc./3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dye bath is then brought to the boil and held at the boil for one hour. Following this, the fabric is rinsed in warm water, then scoured in an aqueous 0.2% soap, 0.2% ash solution. After scouring, the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compounds into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material. As mentioned above, the substituents on the R, $R_1$ and $R_2$ radicals are not critical and serve primarily as auxochrome groups to control the color of the azo compound.

Polymeric linear polyester materials of the terephthalate type are illustrative of the linear aromatic polyester textile materials that can be dyed with the new azo compounds of our invention. The terephthalate fibers sold under the trademarks "Kodel," "Dacron," and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363 for example, can be dyed. The linear aromatic polyester materials specifically named have a melting point of at least 200° C.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. A water-insoluble azo compound having the formula $$Ar\underset{S}{\overset{N}{\diagup}}C-N=N-R_1-\underset{}{\overset{R_2}{N}}-C_2H_4SO_2CH=CH_2$$

wherein
Ar is an ortho-phenylene radical;
$R_1$ is p-phenylene or p-phenylene substituted with lower alkyl, lower alkoxy, chlorine, bromine, lower alkylthio, lower alkanoylamido, or lower alkylsulfonamido; and
$R_2$ is hydrogen; lower alkyl; lower alkyl substituted with lower alkoxy, lower cyanoalkoxy, lower alkanoyloxy, lower carbalkoxy, halogen, lower alkylsulfonyl, carbamoyl, lower alkylcarbamoyl, phenoxy, or lower alkylsulfonamido; lower alkyl —OCOOCH$_2$CH$_2$—; benzyl; phenyl; or phenyl substituted with lower alkyl, lower alkoxy, chlorine or bromine.

2. A water-insoluble azo compound according to claim 1 wherein $$Ar\underset{S}{\overset{N}{\diagup}}C$$

is 2-benzothiazolyl substituted at the 6-position with lower alkylsulfonyl, lower cyanoalkylsulfonyl, nitro, cyano, chlorine, or bromine;
$R_1$ is p-phenylene or p-phenylene substituted with lower alkyl; and
$R_2$ is lower alkyl; lower alkyl substituted with lower alkoxy, phenoxy, lower alkanoyloxy, chlorine, bromine, hydroxy, carbethoxy, or cyano; or benzyl.

3. An azo compound having the formula

[benzothiazole-CH$_3$SO$_2$-]—C—N=N—[phenyl-CH$_3$]—N(C$_2$H$_5$)(C$_2$H$_4$SO$_2$CH=CH$_2$)

4. An azo compound having the formula

[benzothiazole-CH$_3$SO$_2$-]—C—N=N—[phenyl]—N(C$_2$H$_5$)(C$_2$H$_4$SO$_2$CH=CH)

5. An azo compound having the formula

[benzothiazole-NC-]—C—N=N—[phenyl-CH$_3$]—N(C$_2$H$_5$)(C$_2$H$_4$SO$_2$CH=CH$_2$)

6. An azo compound having the formula

[benzothiazole-O$_2$N-]—C—N=N—[phenyl-CH$_3$]—N(C$_2$H$_5$)(C$_2$H$_4$SO$_2$CH=CH$_2$)

7. An azo compound having the formula

[benzothiazole-NC-]—C—N=N—[phenyl]—N(C$_2$H$_5$)(C$_2$H$_4$SO$_2$CH=CH$_2$)

8. An azo compound having the formula

[benzothiazole-O$_2$N-]—C—N=N—[phenyl-Cl]—N(C$_2$H$_5$)(C$_2$H$_4$SO$_2$CH=CH$_2$)

9. An azo compound having the formula

[benzothiazole-NCCH$_2$CH$_2$SO$_2$-]—C—N=N—[phenyl-CH$_3$]—NHC$_2$H$_4$SO$_2$CH=CH$_2$ 10. An azo compound having the formula

[benzothiazole-Cl-]—C—N=N—[phenyl]—N(C$_2$H$_4$OCOCH$_3$)(C$_2$H$_4$SO$_2$CH=CH$_2$)

11. An azo compound having the formula

[benzothiazole-NC-]—C—N=N—[phenyl]—N(C$_2$H$_4$OH)(C$_2$H$_4$SO$_2$CH=CH$_2$)

References Cited

UNITED STATES PATENTS

| | | | |
|---|---|---|---|
| 2,784,204 | 3/1957 | Heyna et al. | 260—152 X |
| 2,916,482 | 12/1959 | Straley et al. | 260—158 X |
| 2,955,901 | 10/1960 | Kruckenberg | 260—158 X |
| 3,097,196 | 7/1963 | Straley et al. | 260—158 X |

FLOYD D. HIGEL, *Primary Examiner.*